June 9, 1953  D. C. GERBER ET AL  2,641,301
METHOD OF MAKING SUCTION CLEANER HOSE
Filed Nov. 22, 1947  3 Sheets-Sheet 1
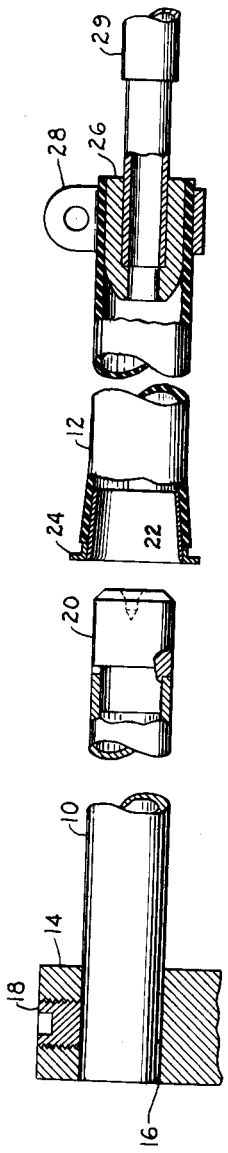
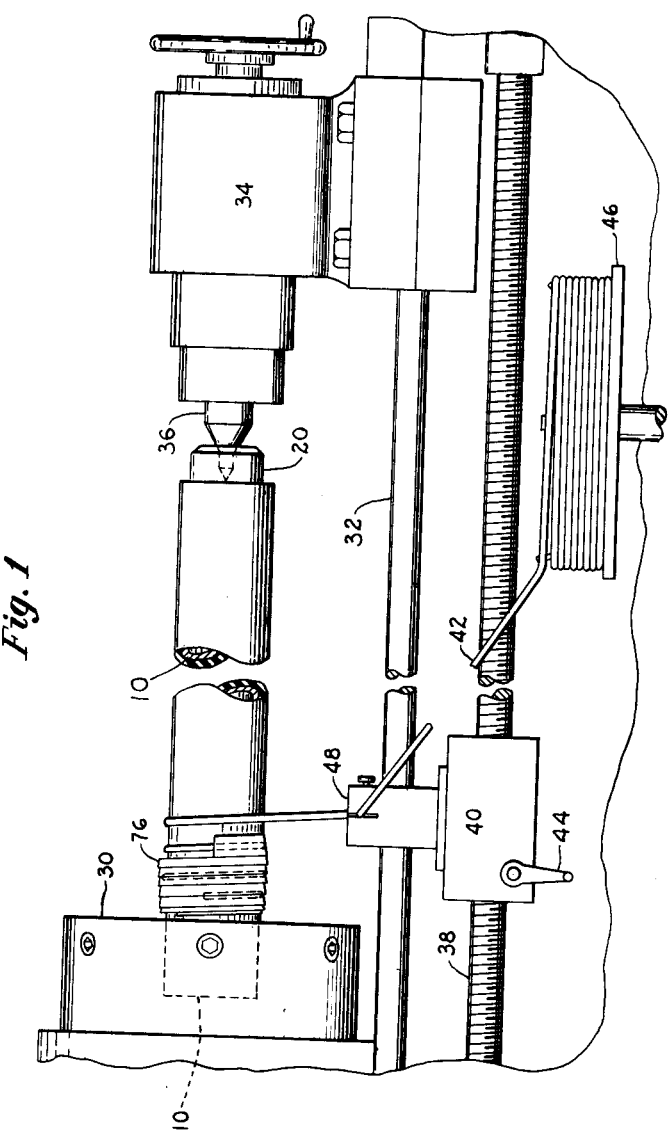
INVENTORS.
Dale C. Gerber &
John E. Vance
BY
Harry S. Dumars
ATTORNEY.

June 9, 1953 D. C. GERBER ET AL 2,641,301
METHOD OF MAKING SUCTION CLEANER HOSE
Filed Nov. 22, 1947 3 Sheets-Sheet 2

INVENTORS.
Dale C. Gerber &
John E. Vance
BY
Harry S. Dumas
ATTORNEY.

June 9, 1953 D. C. GERBER ET AL 2,641,301
METHOD OF MAKING SUCTION CLEANER HOSE
Filed Nov. 22, 1947 3 Sheets-Sheet 3

INVENTORS.
Dale C. Gerber &
John E. Vance
BY
Harry S. Ducasse
ATTORNEY.

Patented June 9, 1953

2,641,301

UNITED STATES PATENT OFFICE 2,641,301

METHOD OF MAKING SUCTION CLEANER HOSE

Dale C. Gerber, North Canton, and John E. Vance, Canton, Ohio, assignors to The Hoover Company, North Canton, Ohio, a corporation of Ohio Application November 22, 1947, Serial No. 787,544

13 Claims. (Cl. 154—8)

This invention relates to a hose and the method of making the same particularly adapted for use with suction cleaners.

Hose for suction cleaner must be very flexible for ease in manipulating the hand tools. It must be quite strong to resist compressive stresses diametrically of the hose so as to prevent collapse and rupture when accidentally trod upon by the operator of the suction cleaner.

It is known to make hose with a helically coiled reenforcing wire in its walls. When the reenforcing wire is vulcanized in situ or otherwise embedded in the walls of the hose, the wire has no freedom of movement and as a result the hose is too rigid for use with suction cleaners. When the reenforcing wire is lift free, that is, the covering is not adhered to the liner, the inner liner will collapse due to the suction within the hose. In addition when the liner is not adhered to the cover the coils of the reenforcing wire will be displaced laterally under compressive forces and by the flexing of the hose.

According to the broadest aspects of this invention, a helically coiled reenforcing wire is positioned between a cover and liner of thermoplastic material and the cover and liner are helically heat-sealed to each other between the convolutions of the helically coiled reenforcing wire. This allows for freedom of movement of the coils of the wire and prevents relative movement between the cover and liner.

Heat-sealing of thermoplastics is accomplished by the application of heat and pressure to the area to be sealed. When the heat is applied externally the thermoplastic material becomes plastic on the outside before sufficient heat is transmitted interiorly to the surface to be sealed, with the result that the thermoplastic may adhere to the mandrel or pressure applying means rather than be sealed interiorly as desired.

According to the present invention the heat is applied interiorly of the materials at the surfaces which are to be sealed together. This is done by making the mandrel, upon which the liner is placed, one electrode of an electrical high frequency generator and by making the pressure applying means the other electrode. The mandrel is then rotated while the pressure applying means is advanced axially of the mandrel between the convolutions of the helically coiled reenforcing wire.

The two electrodes act as the plates of a condenser and the layers of thermoplastic material as the dielectric. The high frequency electrical field set up in the thermoplastic material rapidly heats it to its plastic condition at the surfaces to be sealed so that the heat does not have to be transmitted through the material from the exterior. If found necessary to transmit heat away from the outer surfaces of the material both the mandrel and the pressure applying means may be cooled by flowing a cooling fluid therethrough. If the mass and heat rejecting properties of the mandrel and the pressure applying means are great enough this additional cooling will not be necessary.

According to another feature of this invention additional thermoplastic material, or other adhesive fabric, is wound about the reenforcing wire between the wire and the thermoplastic cover, at the ends of the hose to reenforce the hose at the ends where the fittings are to be attached. The application of dielectric heat will then cause the inner surface of the cover of thermoplastic material and the outer surface of the liner of thermoplastic material to adhere to the reenforcing fabric and bond all three layers together.

According to another feature of this invention the liner and cover are extended beyond the end of the coiled reenforcing wire so that they can be turned in at the ends of the hose before the fittings are attached to further reenforce the hose at the ends.

Other objects and advantages of this invention will become apparent as the description proceeds when taken in connection with the accompanying drawings in which:

Figure 1 shows a mechanism for applying the inner liner to a mandrel in performing the first step in the process of making a hose according to this invention;

Figure 2 shows one form of machine for applying the reenforcing wire helically over the hose liner;

Figure 3:
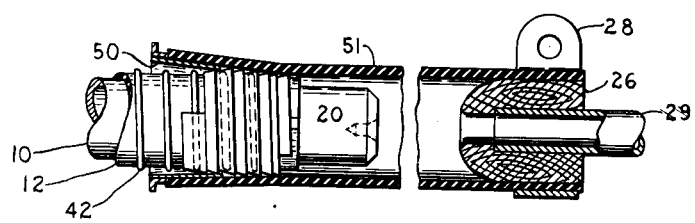
Figure 3 shows the apparatus of Figure 1 being used for applying the hose cover over the reenforcing wire and liner.

Referring to Figure 1 of the drawings the reference numeral 10 represents a mandrel to which the liner 12 of thermoplastic material is to be applied. For the first operation the mandrel 10 may be supported in any manner such as by the support 14. The support 14 has an opening 16 therein through which the end of the mandrel 10 is inserted and held rigidly by a set screw 18.

The mandrel 10 has a plug 20 at its other end which cooperates with a guide ring 22 having a flange 24 adapted to be grasped by the operator. The guide ring 22 is inserted into one end of the liner 12. The opposite end of the liner 12 may be clamped to a hollow plug 26 by a clamp 28. The hollow plug 26 is connected to a source of air under pressure by a flexible hose 29.

Figure 2 shows a machine similar to a metal turning lathe and especially one for cutting threads on a shaft. It has a rotating head 30, a bed-plate 32, a tail stock 34 carrying the usual center 36, a lead screw 38 and a carrier 40 with a clutching handle 44 for connecting the carrier 40 to the lead screw 38 the same as in a thread cutting lathe. The screw 38 is geared to the rotating head 30 in the same way as in a thread turning lathe.

The carrier 40 carries a tensioning device 48 for a reenforcing wire 42 carried by a reel 46 supported at the front of the machine. The mandrel 10 is inserted between the head 30 and the center 36 the same way as a work piece is supported in a metal turning lathe.

Referring to Figure 3 the structure is the same as that in Figure 1 except that the guide 50 is of larger diameter than the guide 22 so that it can slide easily over the liner 12 and the coiled reenforcing wire 42.

Figure 4:
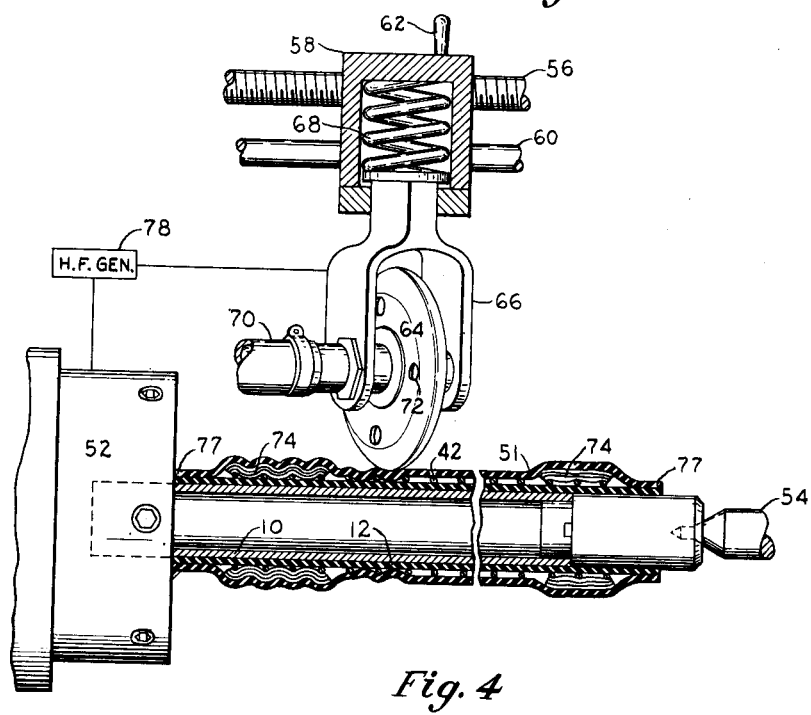
Figure 4 shows a machine for helically heat-sealing the liner and cover to each other between the convolutions of the reenforcing wire.
Figure 5:
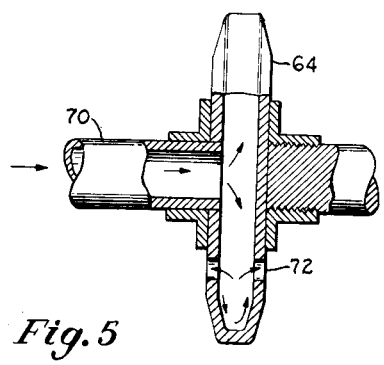
Figure 5 shows the details of the pressure applying electrode shown generally in Figure 4.

Figure 4 also shows a machine similar to a screw thread turning lathe. It has a rotating head 52, a center 54, a lead screw 56, a carrier 58 guided by a guide rod 60 and a clutching and declutching lever 62. The screw 56 and the head 52 are geared together in the manner of a screw cutting lathe so that the carrier 58 will advance at the same rate as the carrier 40 of Figure 2.

Carried by the carrier 58 is a roller 64 rotatably mounted on a U-shaped bracket 66 spring pressed downwardly by a spring 68 suitably positioned on the interior of the carrier 58. The roller 64 is hollow and is connected to a suitable source of cooling fluid, such as air, by a flexible conduit 70. Cooling air exit openings 72 are provided in the side walls of the roller 64.

A high frequency electric generator 78 is provided for producing a high frequency electrostatic field. One side of the generator 78 is connected, in any suitable manner, to the shaft which drives the head 52. The other side of the generator 78 is connected to the bracket 66 which is suitably insulated from the frame of the machine. Thus the mandrel 10 forms one electrode of the generator 78 while the roller 64 forms the other.

As shown in Figure 4 reenforcing coverings 74 are provided between the wire 42 and the cover 51 adjacent each end of the mandrel 10. The liner 12 and cover 51 each extend beyond the end of the coiled reenforcing wire 42 as at 77.

*Operation*

First a continuous length of tubing of thermoplastic material such as vinyl chloride, vinyl acetate, polyvinyl alcohol or other suitable material is extruded in an extruding press so that the wall thickness is about 0.20 to 0.30 inch. This tubing is then cut to a length slightly longer than the length of the finished hose desired.

The mandrel 10 is then inserted in the opening 16 in support 14 and clamped tightly by the set screw 18. One length of the previously cut tubing is then selected and one end clamped to the hollow plug 26 by the clamp 28 and the guide member 22 is inserted in the other end. The guide 22 is then slid over the plug 20 of mandrel 10 and air under pressure is admitted through the hollow plug 26 by means of flexible conduit 29. This will expand the liner 12 whereby it can be easily slid over the mandrel 10 by grasping the collar 24 and pulling the liner over the mandrel 10. During this operation air will act as a sort of lubricant to permit easy movement of liner 12 over mandrel 10.

The mandrel 10, with the liner 12 thereon, is then removed from the support 14. The guide 22, clamp 28 and plug 26 are removed. The mandrel is then inserted between the revolving head 30 and the center 36 of the machine shown in Figure 2 as in placing a work piece in a turning lathe.

One end of the reenforcing wire 42 is then manually coiled about the mandrel 10 and taped to the liner 12 by means of friction tape 76, being careful that the liner 12 extends beyond the end of the coiled wire 42. The free portion of the wire 42 is then inserted into the tensioning device 48 and a proper tension applied thereto. The clutch lever 44 is then operated to connect the carrier 40 to the lead screw 38 and the machine is started. This will cause the wire 42 to be wound helically about the liner 12 with its convolutions spaced axially along the length of the mandrel 10. It has been found that the spacing of the coil should be about one-half inch. The gearing between the revolving head 30 and the lead screw 38 should therefore be so selected so as to give the wire 42 a pitch of about one-half inch.

When the wire 42 has been wound to near the other end of the liner 12 the machine is shut off and the wire taped to the mandrel by friction tape the same way as for the other end.

The mandrel 10 with the liner 12 and spirally wound wire 42 thereon is then removed from the machine. If the tape 76 is not sufficient to provide the necessary reenforcement for the end of the hose additional reenforcement 74 is then applied in any suitable manner. The reenforcement 74 may be a thermoplastic the same as the liner 12 or it may be duck, frictioned tape or any other suitable adherent fabric.

A second length of the previously prepared thermoplastic tubing is then selected to form the cover 51. One end of the cover 51 is then clamped to the hollow plug 26 by the clamp 28 and the guide 50 inserted in the other end. The cover 51 is then applied over the liner 12, reenforcing wire 42 and the reenforcing cover 74 in the same manner as liner 12 was applied to the mandrel 10.

The clamp 28, plug 26, and guide 50 are then removed and the mandrel inserted between the head 52 and the center 54 as in inserting a work piece in a turning lathe.

The roller 64 is then applied to the covering 51 between the convolutions of wire 42 at the left hand end of the cover 51 so that the spring 68 will apply pressure to the covering 51 and force it inwardly between the convolutions of the wire 42. The lever 62 is then operated to connect carrier 58 with the lead screw 56. The high frequency generator 78 and the driving means for the head 52 are then simultaneously energized.

This will cause the mandrel 10 to be rotated and the carrier 58 to be advanced axially along the mandrel 10 at such a rate that the roller 64 will traverse a helical path about the cover 51 of the same pitch as that of the helically wound wire 42 but lying medially between the convolutions of the wire 42.

The operation of the high frequency generator will cause a high frequency electrical field to be set up between the mandrel 10 and the roller 64 so that the liner 12, reenforcing cover 74 and cover 51 will be heated. This heating will take place within the material itself with the result that the cover 51 and liner 12 will become plastic at their contacting surfaces. The roller 64 being cooled the outer surface of the cover 51 will not become plastic. The mass of the mandrel 10 and its heat dissipating properties will prevent the inner surface of the liner 12 from becoming plastic. If necessary the mandrel 10 also may be air cooled. If the mass of the roller 64 is made sufficient to keep the cover 51 cool on its outer surface the air cooling may be entirely dispensed with. The cooling of the outer surface of the cover 51 and the inner surface of the liner 12 prevents the sticking of the material to the mandrel 10 and the roller 64.

As the roller 64 passes over the cover 51, the interior surface of cover 51 and the exterior surface of the liner 12 become plastic. At the ends, where reenforcing covers 74 are present, this will cause the inner surface of cover 51 and the outer surface of liner 12 to adhere to the reenforcement 74 whether it be a thermoplastic or or not. At the central portion the cover 51 and the liner 12 will adhere together between the convolutions of the wire 42 which will prevent relative axial movement between the cover 51 and liner 12 and also allow freedom of movement of the coils of the wire 42.

When this operation is completed the mandrel 10 is removed from the machine and the ends 77 of the liner 12 and cover 51 may then be heated in any suitable manner to heat seal them together. The hose is then removed from the mandrel in any suitable manner. It is not essential that the ends 77 be heat-sealed but in any event they are then turned inwardly inside the hose to aid in reenforcing the hose as the fittings are attached.

Figure 6:
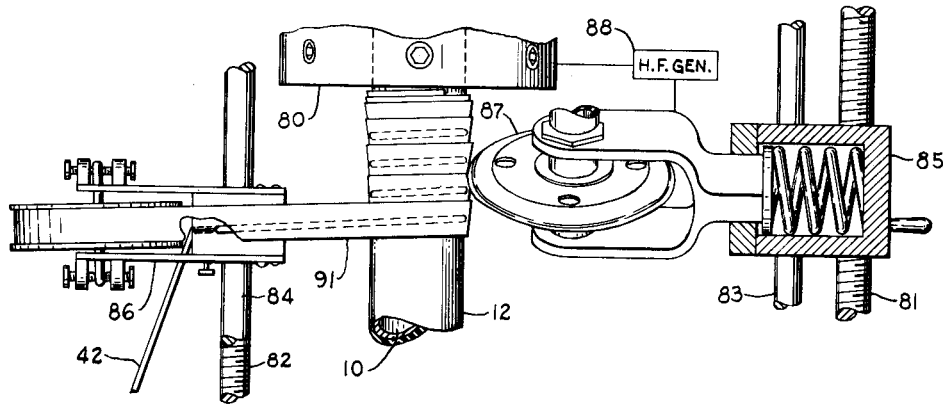
Figure 6 shows an alternate way of simultaneously applying the reenforcing wire and the thermoplastic cover and in heat-sealing the cover to the liner between the convolutions of the reenforcing wire.
Figure 7:
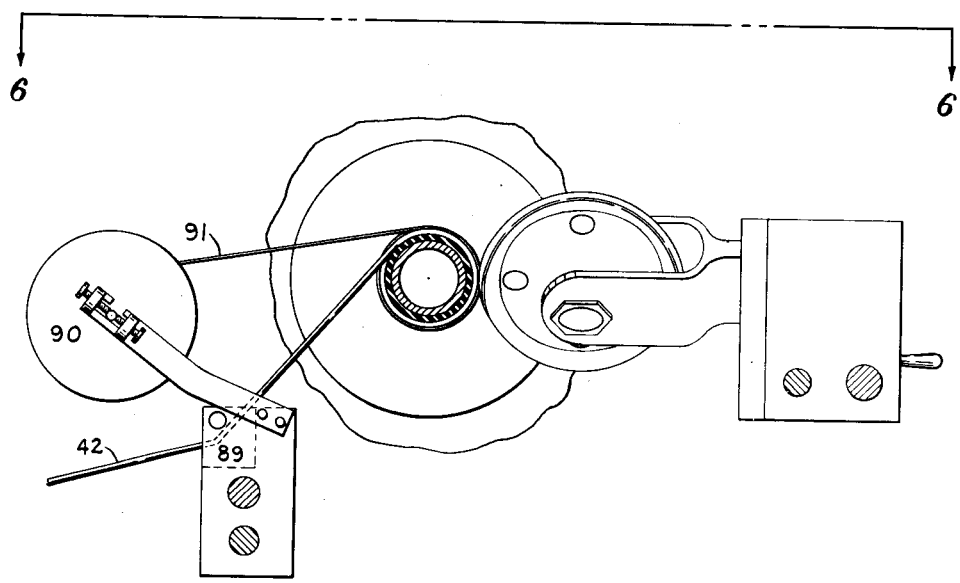
Figure 7 shows the details of the wire and cover applying means of Figure 6.

Figures 6 and 7 disclose an alternate machine for making the hose of this invention. This machine also operates similar to a screw turning lathe. It has a revolving head 80, lead screws 81 and 82, two guides 83 and 84, and two carriers 85 and 86. The pitch of the lead screws 81 and 82 is the same and the gearing between them and the rotating head 80 is of the same ratio. The carrier 85 carries an electrode roller 87 similar to that of Figure 4 forming one electrode of the high frequency generator 88, the mandrel 10 forming the other electrode as in Figure 4. The carrier 86 carries a tensioning device 89 similar to the tension device 48 of Figure 2 and a reel 90 carrying a roll of thermoplastic tape 91.

In operation the mandrel 10 with the liner 12 thereon is inserted in the machine as in the machine of Figure 2. The ends of the wire 42 and tape 91 are attached to the liner 12 with the tape 91 overlying the wire 42. The carrier 86 is then clutched to screw 82 and the machine operated to wind a few turns of the wire 42 and tape 91 over the liner 12. The tape 91 is of such width that its edges overlap between the convolutions of the wire 42. The machine is then stopped and the roller 87 applied over the tape 91 at its overlapping edges and the carrier 85 is clutched to the screw 81. The high frequency generator 88 and the driving means for the head 80 are then simultaneously energized.

This will cause both carriers 85 and 86 to advance at the same rate axially along the mandrel 10 so as to helically wind the wire 42 and tape 91 over the liner 12. At the same time the high frequency electric field produced between the roller 87 and the mandrel 10 will heat-seal the overlapping edges of the tape 91 to each other and to the liner 12 between the convolutions of the wire 42.

From the foregoing it can be seen that this invention provides a flexible hose with a wire reenforcement lying between the hose liner and cover in which the wire coils have freedom of movement and the cover and liner are adhered to each other.

It can also be seen that this invention provides a new method of forming a suction cleaner hose in which the liner and cover are heat-sealed to each other between the convolutions of an intermediate reenforcing wire.

While we have shown but two apparatuses for performing the process of this invention and for making a hose according to this invention it is to be understood that these embodiments are to be taken as illustrative only and not in a limiting sense. We do not wish to be limited to the specific structure and method shown and described but to include all improvements and variations thereof except as limited by the scope of the claims.

We claim:

1. The method of making a flexible hose comprising, applying a seamless tube of thermoplastic heat fusible material to a cylindrical mandrel, wrapping a reenforcing wire helically about said thermoplastic tube with the convolutions of the wire spaced along the length of said tube, applying a seamless covering of thermoplastic heat fusible material over the helically wound wire and thermoplastic tube and heat-sealing the thermoplastic covering to the thermoplastic tube solely between the convolutions of the helically wound reenforcing wire whereby the reenforcing wire has freedom of movement in the space between the fused portions so as to render the completed hose flexible.

2. The method of making a flexible hose comprising, applying an inner seamless thermoplastic heat fusible covering over a cylindrical mandrel, rotating said mandrel, applying a reenforcing wire to said rotating covering and mandrel while advancing said wire along the length of said covering and mandrel whereby said wire is wound helically over said seamless covering with the convolutions spaced apart along the length of said mandrel, applying an outer covering of thermoplastic heat fusible material over said reenforcing wire and thermoplastic covering, continuing the rotation of said mandrel while applying a high frequency electric field thereto so as to form one electrode of a high frequency generator, applying the other electrode of the high frequency generator to the outer covering solely between the convolutions of said reenforcing wire while advancing said second electrode along the length of said mandrel between the convolutions of said reenforcing wire whereby dielectric heat is applied to said coverings between the convolutions of said wire so as to fuse said coverings to each other solely between said wire convolutions.

3. The method of making a flexible hose consisting of a seamless liner of heat fusible thermoplastic material, a seamless covering of heat fusible thermoplastic material and a helically wound reenforcing member lying between said liner and cover comprising, the step of helically fusing said liner and cover to each other solely between the convolutions of said helically wound reenforcing member whereby a helical seam is formed between said liner and cover leaving a free space for said reenforcing member between the helical seam and said reenforcing member to allow freedom for movement of said reenforcing member when said hose is flexed.

4. The method of making a flexible hose comprising, applying a seamless hose liner of thermoplastic heat fusible material to a cylindrical mandrel, winding a reenforcing member helically over said lining with the convolutions thereof spaced along the length of said mandrel, applying a seamless thermoplastic heat fusible covering for said hose over said lining and reenforcing member and helically fusing said lining and covering to each other solely between the convolutions of said reenforcing member.

5. The method of making a flexible hose comprising, applying a seamless thermoplastic heat sealable liner for said hose to a mandrel, helically winding a reenforcing member over said lining, applying a seamless thermoplastic heat sealable outer covering for said hose over said liner and reenforcing member, revolving said mandrel while applying localized heat to said liner and cover solely between the convolutions of said reenforcing member.

6. The method of making a flexible hose comprising, applying a seamless thermoplastic heat fusible liner for said hose to a mandrel, helically winding a reenforcing member over said liner with the convolutions thereof spaced along the length of said mandrel, applying a seamless thermoplastic heat fusible outer covering over said liner and reenforcing member, and revolving said mandrel while applying dielectric heat to said liner and cover solely between the convolutions of said reenforcing member so as to helically fuse said liner and cover together solely between the convolutions of said reenforcing member.

7. The method of making a flexible hose comprising, applying a seamless thermoplastic heat fusible liner for said hose to a mandrel, attaching a reenforcing member to said liner near one end thereof, revolving said mandrel while advancing the free portion of said reenforcing member along the length of said mandrel at a definite rate so as to helically wind said reenforcing member over said liner with the convolutions thereof spaced along the length of said mandrel, applying a seamless thermoplastic heat fusible cover for said hose over said liner and reenforcing member, again rotating said mandrel while applying heat to said liner and cover solely between the convolutions of said reenforcing member while moving said mandrel and heat source relative to each other axially of said mandrel so as to fuse said liner and cover to each other solely between the convolutions of said reenforcing member.

8. The method of making a flexible hose comprising, applying a seamless thermoplastic heat fusible liner for said hose to a mandrel, attaching a reenforcing member to said liner near one end thereof, revolving said mandrel while advancing said reenforcing member along the length of said mandrel at a rate to form helical convolutions spaced along the length of said mandrel, applying a seamless thermoplastic heat fusible cover for said hose over said liner and reenforcing member, again rotating said mandrel while helically applying dielectric heat to said liner and cover solely midway between the convolutions of said reenforcing element to fuse said liner and cover helically between the convolutions of said reenforcing member.

9. The method of making a flexible hose comprising, applying a first seamless covering of thermoplastic heat fusible material to a mandrel, securing one end of a reenforcing member to one end of said first covering, rotating said mandrel while advancing said reenforcing member axially along said mandrel at a constant rate whereby said reenforcing member is wound helically over said first covering with its convolutions spaced axially along said first covering, applying a second seamless covering of thermoplastic heat fusible material over said reenforcing member and said first covering, applying an electrode to said second covering solely between the convolutions of said reenforcing member, continuing to rotate said mandrel while advancing said electrode axially along said mandrel at the same rate as said reenforcing member was advanced and connecting said mandrel and electrode to a high frequency generator while said mandrel is being rotated and said electrode is being advanced so as to electrostatically heat said coverings and fuse them together solely between the convolutions of said reenforcing member.

10. The method of making a flexible hose comprising, applying a seamless hose liner of thermoplastic heat fusible material to a mandrel, securing one end of a reenforcing member to one end of said liner, rotating said mandrel while advancing said reenforcing member axially along said mandrel at a rate sufficient to apply said reenforcing member helically over said liner with the convolutions thereof spaced axially of said liner, applying a reenforcing cover over said reenforcing member and liner at each end of said mandrel, applying a seamless cover of thermoplastic heat fusible material over said reenforcing cover, reenforcing member and liner, applying a pressure member to said thermoplastic cover midway between the convolutions of said reenforcing member, rotating said mandrel while advancing said pressure member axially along said mandrel at the same rate as said reenforcing member was advanced and applying a high frequency electric field to said mandrel and said pressure member while said mandrel is being rotated and said pressure member is being advanced.

11. The method of making a flexible hose consisting of a seamless liner of thermoplastic heat fusible material, a seamless cover of thermoplastic heat fusible material, a helically wound reenforcing member between said liner and cover and a reenforcing covering between said reenforcing member and cover at each end thereof comprising the step of helically fusing the cover and liner to the reenforcing cover at the ends and the cover and liner to each other between the ends, solely mid-way between the convolutions of said reenforcing member.

12. The method of making a flexible hose comprising, applying a seamless hose liner of thermoplastic heat fusible material to a mandrel, winding a reenforcing member helically over said liner with the convolutions thereof spaced axially of said mandrel, applying a reenforcing cover over said reenforcing member and liner at each end of said mandrel, applying a seamless covering of thermoplastic heat fusible material over said reenforcing covering, reenforcing member and liner and helically fusing said liner and cover to said reenforcing cover and said cover to said liner solely midway between the convolutions of said reenforcing member.

13. The method of making a flexible hose comprising, applying a seamless hose liner of thermoplastic heat fusible material to a mandrel, winding a reenforcing member helically over said liner adjacent the ends thereof with the convolutions of said reenforcing member being spaced axially of said mandrel leaving the ends of said liner unwound for a short distance, applying a seamless reenforcing cover over said reenforcing member at its ends leaving its central portion uncovered, applying a thermoplastic heat fusible cover of the same length as said liner over said liner, reenforcing cover and reenforcing member, applying localized heat helically along the length of said reenforcing element and solely between the convolutions thereof whereby said cover and liner are helically fused to each other between the reenforcing covers and said cover and liner are helically fused to said reenforcing cover and fusing said liner and said cover together at their ends where they extend beyond said reenforcing member.

DALE C. GERBER.
JOHN E. VANCE.

References Cited in the file of this patent

UNITED STATES PATENTS

| Number | Name | Date |
| --- | --- | --- |
| 1,478,083 | Whitmarsh | Dec. 8, 1923 |
| 1,746,701 | Kimmich | Feb. 11, 1930 |
| 2,280,771 | Dufour et al. | Apr. 28, 1942 |
| 2,321,064 | Broedling | June 8, 1943 |
| 2,351,692 | Miller | June 20, 1944 |
| 2,407,354 | Walton et al. | Sept. 10, 1946 |
| 2,430,081 | Roberts et al. | Nov. 4, 1947 |
| 2,438,498 | Geist et al. | Mar. 30, 1948 |
| 2,474,035 | Crandon | June 21, 1949 |
| 2,551,631 | Pearce | May 8, 1951 |

FOREIGN PATENTS

| Number | Country | Date |
| --- | --- | --- |
| 575,807 | Great Britain | Mar. 6, 1946 |